(12) United States Patent
Campbell et al.

(10) Patent No.: US 6,848,042 B1
(45) Date of Patent: Jan. 25, 2005

(54) INTEGRATED CIRCUIT AND METHOD OF OUTPUTTING DATA FROM A FIFO

(75) Inventors: Scott J. Campbell, Frederick, CO (US); Thomas E. Fischaber, Golden, CO (US); Jeremy B. Goolsby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/402,742

(22) Filed: Mar. 28, 2003

(51) Int. Cl.[7] .......................... G06F 15/00; G06F 12/00
(52) U.S. Cl. ............................ 712/35; 711/5; 711/119
(58) Field of Search ...................... 326/38–41; 710/126, 710/132; 711/150, 153, 123, 119, 168, 214; 365/189.04, 220, 230.03; 712/35

(56) References Cited

U.S. PATENT DOCUMENTS

| | | | | |
|---|---|---|---|---|
| 5,519,345 A | * | 5/1996 | Farrell et al. | ............... 327/108 |
| 5,831,467 A | * | 11/1998 | Leung et al. | ............... 327/319 |
| 5,954,811 A | * | 9/1999 | Garde | ........................ 712/35 |
| 6,212,591 B1 | * | 4/2001 | Kaplinsky | ................... 710/305 |

* cited by examiner

*Primary Examiner*—Vibol Tan
(74) *Attorney, Agent, or Firm*—John J. King

(57) ABSTRACT

A method of outputting data from a FIFO incorporated in an integrated circuit generally determines whether input data is valid during a first clock cycle. The method then outputs data from a plurality of output barrel slots during a second clock cycle. Data is then shifted from predetermined upper barrel slots to predetermined output barrel slots during second cycle based upon a barrel count. Finally, data is shifted into the FIFO during said second cycle based upon the barrel count. A new barrel count of valid data in the FIFO can then be determined. Circuitry for implementing the embodiments of the invention is also disclosed.

35 Claims, 6 Drawing Sheets

| Barrel Slot | BarrelCount = 0 | BarrelCount = 1 | BarrelCount = 2 | BarrelCount = 3 | BarrelCount = 4 |
|---|---|---|---|---|---|
| 12 | | | | D9 | |
| 11 | | | D9 | D8 | |
| 10 | | D9 | D8 | D7 | |
| 9 | D9 | D8 | D7 | D6 | |
| 8 | D8 | D7 | D6 | D5 | B12 |
| 7 | D7 | D6 | D5 | D4 | B11 |
| 6 | D6 | D5 | D4 | D3 | B10 |
| 5 | D5 | D4 | D3 | D2 | B9 |
| 4 | D4 | D3 | D2 | D1 | B8 |
| 3 | D3 | D2 | D1 | B7 | B7 |
| 2 | D2 | D1 | B6 | B6 | B6 |
| 1 | D1 | B5 | B5 | B5 | B5 |

# INTEGRATED CIRCUIT AND METHOD OF OUTPUTTING DATA FROM A FIFO

FIELD OF THE INVENTION

The present invention relates generally to integrated circuits, and in particular, to an integrated circuit having a first-in first out (FIFO) circuit, and a method of outputting data from a FIFO circuit.

BACKGROUND OF THE INVENTION

As electronic devices and systems continue to evolve, their operating speeds continue to increase. However, some components of such devices and systems may operate at a lower speed, and therefore may not be compatible with, or may limit, high speed devices systems. Because of the high data rates of many networking applications, it may be necessary to multiplex the input data words operating at a high frequency into a larger data word, comprised of several smaller data words, operating at a lower frequency. One conventional networking standard enables the development of interoperable products and services for data switching and routing using optical networking technologies, provides one such standard in which this must be done. In this networking standard, for example, the interface data bus is 16-bits wide and operates dual-data-rate (DDR) at up to 500 MHz. In order to internally process that data in a device operating at a lower speed, it is necessary to multiplex that data into an internal format of a wider parallel bus operating at a lower clock frequency (i.e. 64-bits at 250 MHz). Conversely, when writing data out, it is necessary convert the data from the internal parallel bus at the lower frequency to the external 16-bit dual-data-rate format at the higher frequency. In this application, between one and nine 16-bit data words may be written into the memory per clock cycle. Because of the multiplexing necessary to send one 16-bit DDR word at 500 MHz, the internal logic must read four 16-bit words from memory per 250 MHz clock cycle.

The ability to write a variable number of words, such as a Byte-Addressable memory in which a portion of the memory can be written to, is known. A barrel shifter has the ability to shift or align output data with respect to the input data alignment. Similarly, a memory has the ability to store data so that there are no gaps between data words. However, these logical functions, either independently or when used together, are not sufficient to solve the problem of inefficient data transfer caused by idle words in a data path. While the barrel shifter provides the ability to align and shift the input data, it allows for no shift-independent storage capability. In addition, a barrel shifter provides an inefficient layout because it provides that ability to shift data from any location to any other location. That is, because data can be shifted from a barrel location to any other barrel location, circuitry must be provided for each barrel slot to receive data from any other barrel slot. In a logic circuit, such as a field programmable gate array (FPGA) or complex programmable logic device (CPLD), such a requirement would require additional logic gates. Similarly, a block memory provides the ability to write a constant amount of data in, and read a constant amount of data out each clock cycle. While the block memory allows the ability to have asymmetric data widths on the read and write interfaces, the read and write operations always require the same data width. Further, there is no alignment or empty word packing capability within the block memory.

Accordingly, there is a need for an improved integrated circuit and method of outputting data from a FIFO which can operate at a lower clock rate and read or write data at a higher clock rate.

SUMMARY OF THE INVENTION

In order for devices or systems having memory elements to be used in high speed networking data path applications, the embodiments of the present invention multiplex data into a wider input word that can be processed at a lower frequency. The embodiments of the present invention insure that the memory element does not consume any of the system bandwidth by inserting ""blank"" or idle words onto the data path. In particular, a method of outputting data from a FIFO incorporated in an integrated circuit generally determines whether input data is valid during a first clock cycle. The method then outputs data from a plurality of output barrel slots during a second clock cycle. Data is then shifted from predetermined upper barrel slots to predetermined output barrel slots during second cycle based upon a barrel count. Finally, data is shifted into the FIFO during said second cycle based upon the barrel count. A new barrel count of valid data in the FIFO can then be determined. Circuitry for implementing the embodiments of the invention is also disclosed.

DETAILED DESCRIPTION OF THE DRAWINGS

Figure 1:
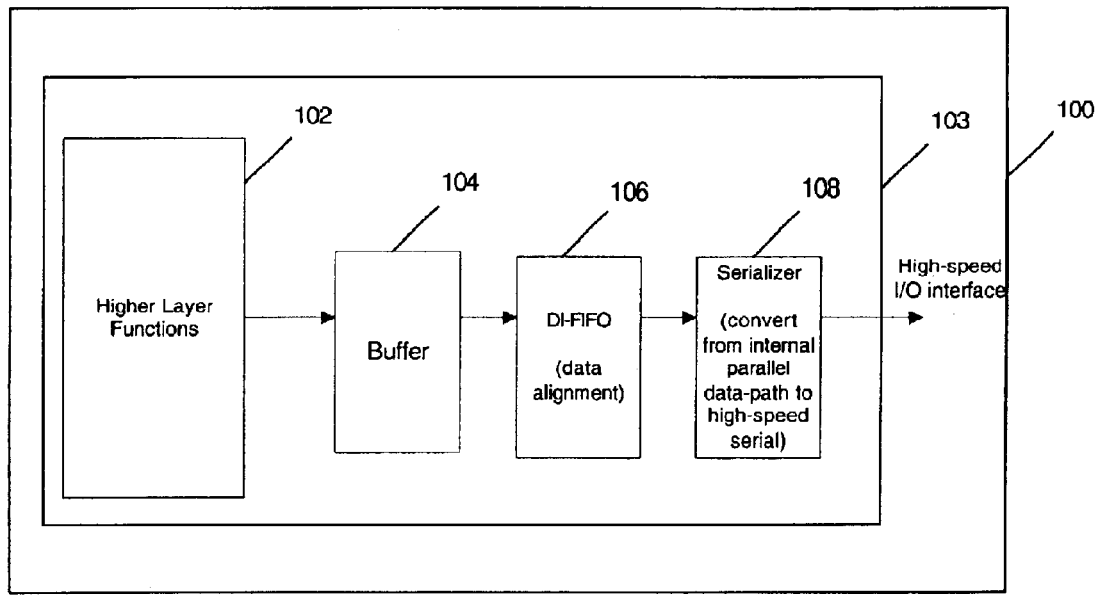
FIG. 1 is a block diagram of an embodiment of an integrated circuit employing the present invention.

Turning first to FIG. 1, a block diagram shows a device 100 employing an embodiment of the present invention. In particular, a high layer function block 102 comprises conventional functions of an integrated circuit 103 employing a FIFO 104. Such integrated circuits could include an FPGA, CPLD, or any other logic device, memory device or processing device incorporating a FIFO. Generally, the high layer functions block 102 provides data to buffer 104. Buffer 104 is coupled to a dynamic input first-in first-out (DI-FIFO) block 106 and provides input data to DI-FIFO 106. The DI-FIFO 106 provides data alignment for high speed data output, as will be described in more detail below. Finally, the data is provided to a serializer 108 which converts internal parallel path data to high speed serial data. For example, the serializer 108 could convert a sixty-four bit word read from the memory read at a clock rate of 200 MHz to four sixteen bit words at 400 MHz. The output of the serializer 108 is provided to the device 100. The device 100 could be any electronic device or system incorporating a memory element.

As will be described in more detail below, the DI-FIFO allows multiple data words to be written per clock cycle and allows a constant number of data words to be read per clock cycle. The DI-FIFO also shifts data internally such that no gaps appear between words, and stores only the minimum number of data words necessary for minimum device resource utilization and maximum operational speed. The DI-FIFO 106, which provides functions of both a barrel shifter and block memory, allows the width of the data written into the input port to change dynamically while a fixed width data word is read each clock cycle. The DI-FIFO automatically aligns the data so that it can be continuously accessed with no discontinuities.

Figure 2:
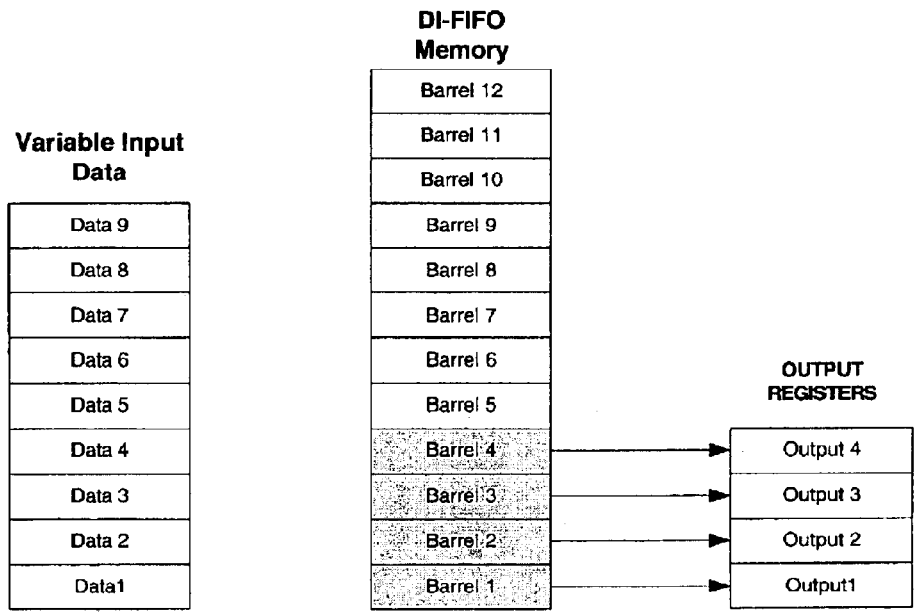
FIG. 2 is a block diagram of a memory system according to an embodiment of the present invention.
Figures 3, 4:
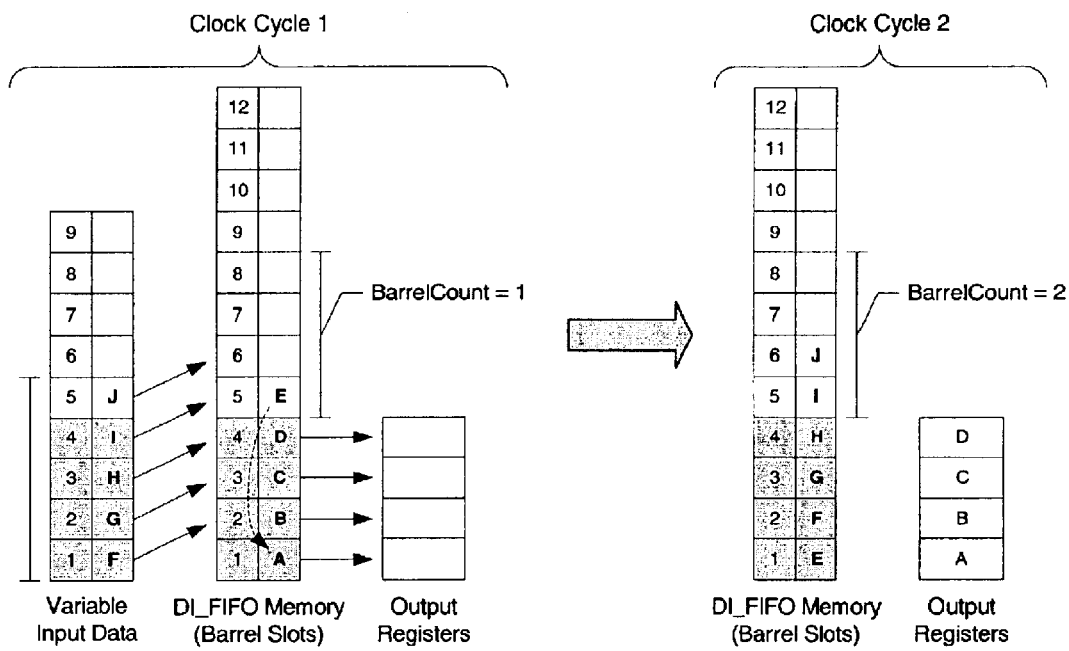
FIG. 3 is a block diagram showing the operation of the FIFO circuit according to an embodiment of the present invention.
FIG. 4 is a table showing the available inputs to barrel slots according to an embodiment of the present invention.

Turning now to FIGS. 2 and 3, a block diagram shows a DI-FIFO 106 according to an embodiment of the present invention. Data, which could be variable length data, is input to a FIFO in a number of data blocks. The data is then provided to a memory having a plurality of barrel slots. Some of the barrel slots, for example barrel slots 1–4 as shown in this example, are output barrel slots used to provide constant output data. An example of the operation of the FIFO circuit is shown in FIG. 3. As shown in this example, during clock cycle 1, the DI-FIFO has five words of data already stored (shown as data words A–E), and the write interface of the memory is loading five new words into the memory (shown as data words F–J), while the read interface is reading out four words of data. The arrows indicate the position the data will occupy during clock cycle number 2. As will be described in more detail in reference to FIG. 4, the barrel count indicates the number of DI-FIFO data words that must be shifted (i.e. shifted from upper barrel slots to output barrel slots) during this clock cycle. During clock cycle number 2, the data in barrel slots 1–4 are read out of the memory into the Output Registers while data is shifted from upper barrel slots (e.g. barrel slots 5–8) to output barrel slots (e.g. barrel slots 1–4). In the example of FIG. 3, data word E is shifted within the DI-FIFO from barrel slot 5 to barrel slot 1. Finally, the data from the input registers is loaded into the DI-FIFO starting at barrel slot 2. The resulting barrel count at the end of clock cycle 2 is 2.

Turning now to FIG. 4, a table shows the available inputs to a barrel slot depending upon the barrel count according to an embodiment of the present invention. The DI-FIFO must select either a barrel word or an incoming data word. This decision is based on the barrel valid signal, and will be described in more detail in reference to FIGS. 6–9. The DI-FIFO Slot (n) must load data from barrel slot (n+4) when either the DI-FIFO is full, or when that barrel slot (n+4) contains valid data. Accordingly, the barrel valid signal is asserted when either of these conditions exists.

Further, the shifting of data into barrel slots may be optimized for all barrel slots because these slots will only load barrel data when the DI-FIFO is not full. New data is preferably loaded into the memory only when that memory will not have four valid data words in barrel slots one through four in the next clock cycle, where a valid data word includes data in a barrel slot. Because the DI-FIFO stores valid bits for each word, the DI-FIFO can be considered full when barrel slot eight is valid. This is possible because in the next clock cycle, barrel slot eight will be loaded into barrel slot four. Because of the contiguous data packing operation of the DI-FIFO, there are no gaps between valid data words in the barrel slots. This implies that if barrel slot four is valid, then barrel slots one through three are also valid. In this case, with barrel slots one through four valid, the DI-FIFO is considered full.

The highlighted items in FIG. 4 (designated by B5–B12) represent the data that is already in the memory, while the non-highlighted items represent the new data being written into the memory. This table shows the result of the merging operation from clock cycle 1 to clock cycle 2. For example, when the Barrel Size was 1, the 16-bit data word (B5) was in barrel slot 5 during the previous clock cycle. From this table it is also apparent that for barrel slot 1, the only possible inputs are incoming data word (D1) and the barrel memory word ($B_5$), while barrel slot 2 can have D2, D1, or B6 etc. The most one memory slot can have is 5 inputs, as shown in barrel slots 4 through 8. When the barrel count is 4 (i.e. the maximum barrel count), the DI-FIFO is considered full, and new data is not loaded into the memory. That is, data is only shifted down from upper barrel slots. As will be described in detail in reference to circuits implementing the various embodiments of the present invention, this requirement will limit the logic required to load data into a barrel slot.

Figure 5:
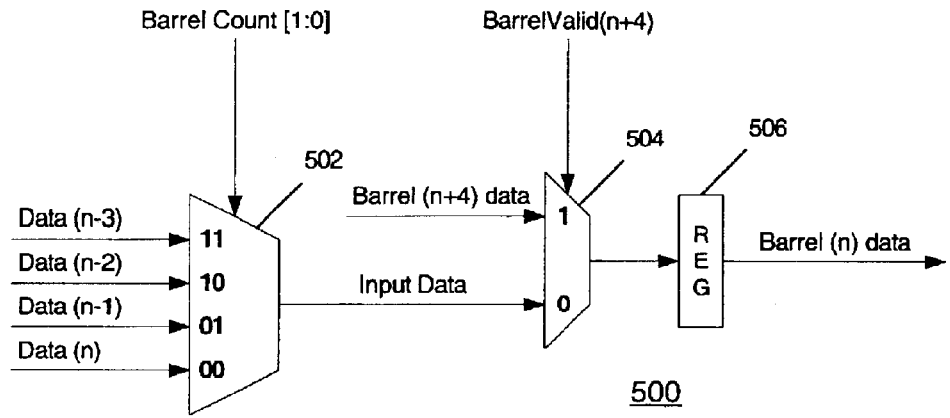
FIG. 5 is a functional block diagram of the barrel logic according to an embodiment of the present invention.

Turning now to FIG. 5, a functional block diagram shows a barrel logic circuit according to an embodiment of the present invention. The functional unit preferably consists of two multiplexers. A multiplexer 502 is used to select the appropriate data from the input registers based on the current barrel count value. A multiplexer 504 is used to select whether barrel slot data or input register data is loaded into the barrel slot. In this example, because four input data words are read each clock cycle, the barrel slot feeding the current barrel slot barrel (n) is barrel slot barrel (n+4). The selection of input register data or barrel slot data is made based on whether valid data is occupying the barrel slot feeding it (e.g. barrel (n+4) in this case). A one-bit valid signal is preferably used instead of the barrel count for resource optimization. The output of the multiplexer 504 is coupled to a register 506 which outputs barrel (n) data to barrel slot (n). "n" is a positive integer which in the example of FIG. 5 has a value from 1 to 12. The index i for data (i) is also a positive integer (i>0). Hence where data (n) has an index less than 1, for example, Data (n−1), Data (n−2), or Data (n−2), when n=1, the associated input lines are disconnected from the multiplexer 502.

Figure 6:
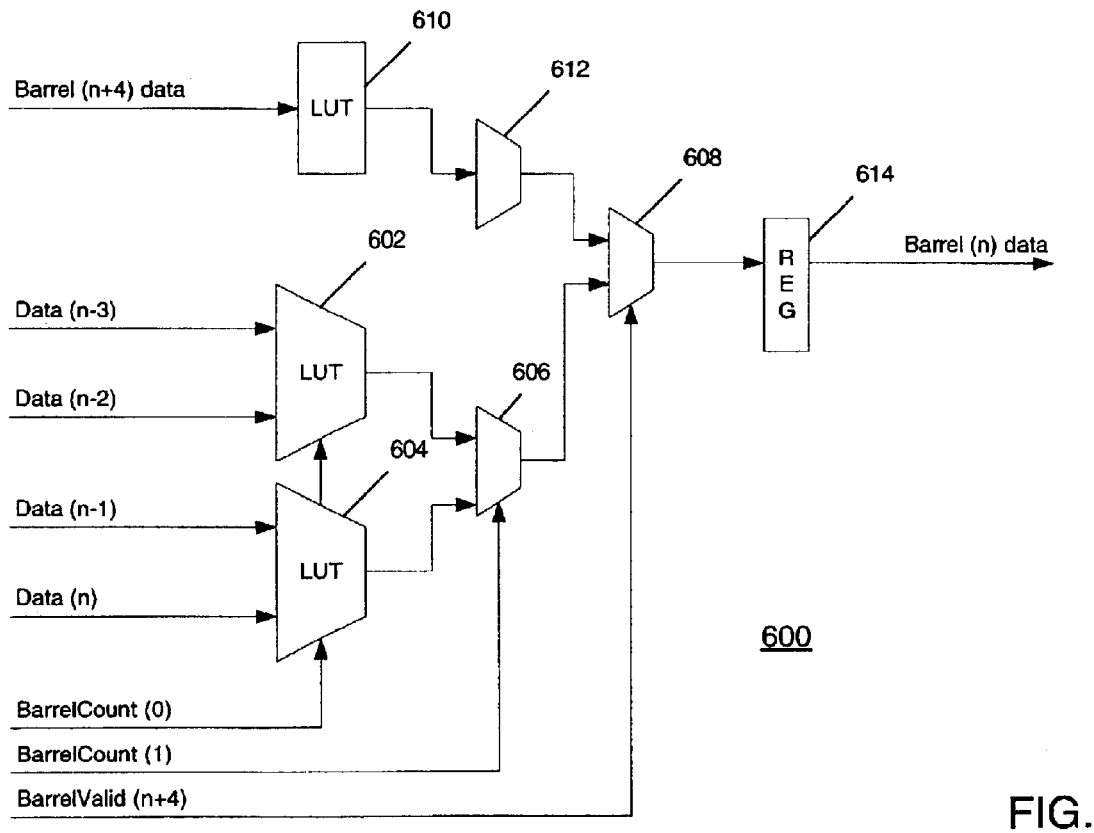
FIG. 6 is a block diagram of the barrel logic according to an alternate embodiment of the present invention.

Turning now to FIG. 6, a block diagram shows a barrel logic circuit according to an alternate embodiment of the present invention. In particular, a first look up table (LUT) 602 and a second lookup table 604 are coupled to receive input data as well as a first bit of a barrel count. The output of the first lookup table 604 and the second lookup table 602 are coupled to a multiplexer 606, which is also coupled to receive the second bit of the barrel count. The output of the multiplexer 606 is coupled to a multiplexer 608, which is also coupled to receive a barrel select signal. Depending upon the barrel select signal, data from an upper barrel slot can also be coupled to the multiplexer 608 by way of a lookup table 610 and a multiplexer 612. The output of the multiplexer 608 is coupled to register 614, which generates a barrel (n) output. A key to an efficient implementation of shifting data as shown in FIG. 6 is that the lower two bits of the barrel count signal are used to directly route the data to the output. This eliminates the need for control signal decoding, and speeds up the operation of the DI-FIFO allowing operation in excess of 200 MHz.

Figure 7:
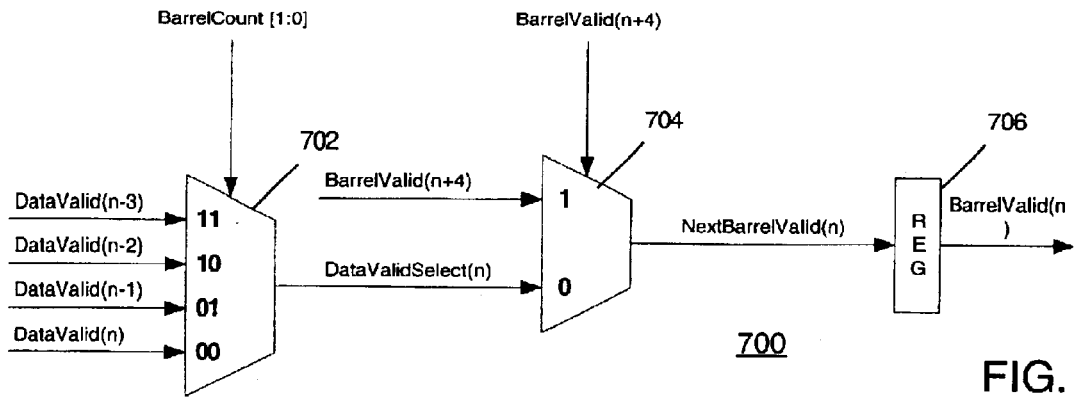
FIG. 7 is a functional block diagram of a circuit for determining a valid bit according to an embodiment of the present invention.

In addition to the routing of data, the DI-FIFO must also keep track of whether that data is valid or not. As shown in FIG. 7, a functional block diagram provides a circuit for determining a valid bit according to an embodiment of the present invention. Information regarding whether data is valid is used to generate the next barrel valid value as well as route the correct data to the barrel slot. A multiplexer 702 is used to select the appropriate data valid signal from the input registers based on the current barrel count value. A multiplexer 704 is used to select whether a data valid signal or a barrel valid signal is input to generate a next barrel valid signal. The output of the multiplexer 704 (i.e. next barrel valid (n)) is coupled to a register 706 generates a barrel valid (n) signal. The function of the next barrel valid signal to generate a barrel count will be described in more detail in reference to FIG. 9.

Figure 8:
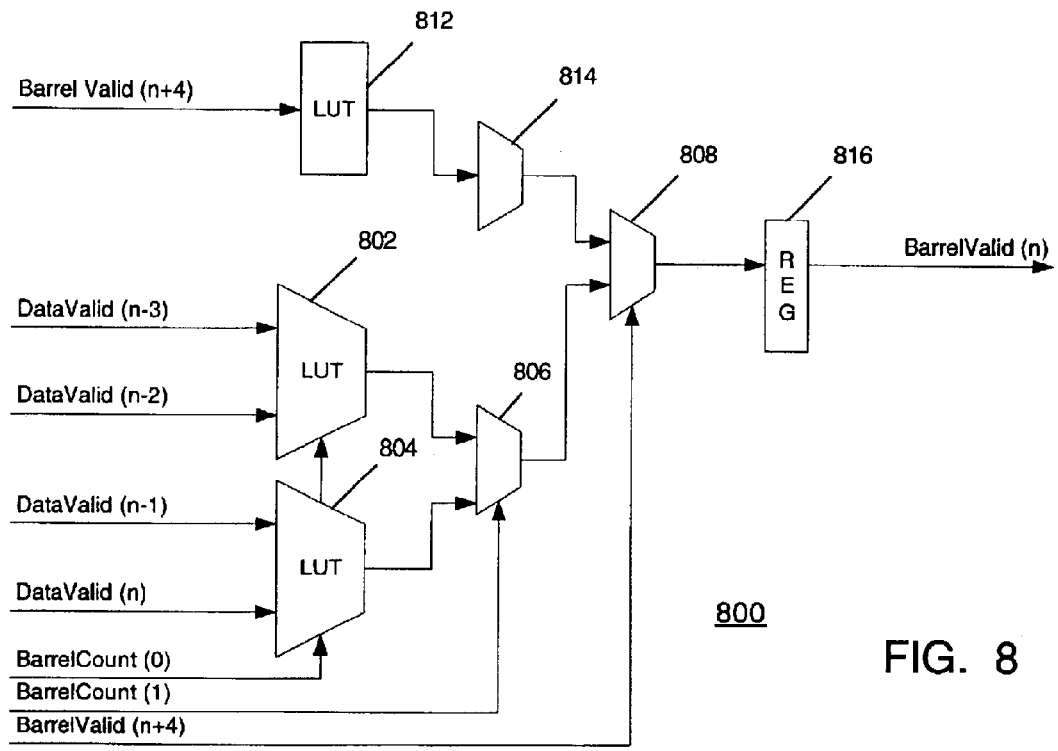
FIG. 8 is a block diagram of the circuit for determining a valid bit according to an alternate embodiment of the present invention.

Turning now to FIG. 8, a block diagram shows a circuit for determining a valid bit according to an alternate embodiment of the present invention. In particular, a first look up table (LUT) 804 and a second lookup table 802 are coupled to receive valid data signals as well as a first bit of a barrel count. The output of the first lookup table 804 and the second lookup table 802 are coupled to a multiplexer 806, which is also coupled to receive the second bit of the barrel count. The output of the register 806 is coupled to a register 808, which is also coupled to receive a Barrel Select signal. Depending upon the barrel select signal, either a data valid signal or a barrel valid signal can be coupled to the multiplexer 808. The output of the multiplexer 808 is coupled to register 814, which generates a barrel valid (n) signal.

Figure 9:
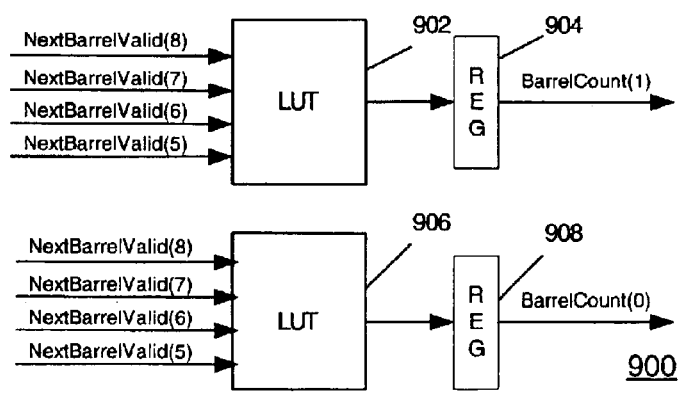
FIG. 9 is a block diagram of the circuit for determining barrel size according to an alternate embodiment of the present invention.

Turning now to FIG. 9, a block diagram shows a circuit for determining a barrel count based upon next barrel valid signal according to an embodiment of the present invention. In order to determine what data will be loaded into each barrel slot, a barrel count is needed. To reduce the logic required and increase the operational speed, the barrel count is maintained only over a limited number of barrel slots. The count is maintained over four barrel slots (i.e. barrel slots 5–8) in the current example where data is output from barrel slots 1–4. The count value is generated each clock cycle based on how many valid data words will be in barrel slots 5–8. These valid signals, represented by the signal next barrel valid (n), have already been decoded by the DI-FIFO Valid Bit logic (for example by the circuits of FIG. 7 or 8), and thus the barrel count only requires one additional level of logic to implement the conversion function. While the four next barrel valid signals can represent from zero to four valid words, the two-bit barrel count value can only represent values from zero to three. In the case of four words valid, the size can be set to an arbitrary value. This is possible because when four words are valid, the DI-FIFO will be full, and no new data will be loaded into the DI-FIFO next clock cycle.

Figure 10:
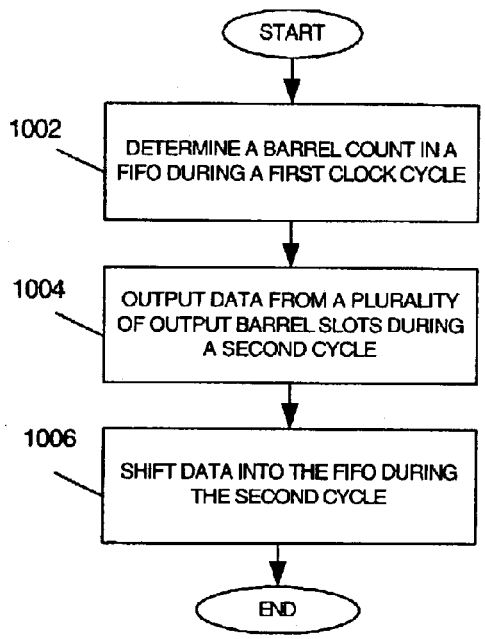
FIG. 10 is a flow chart showing a method of shifting data into barrel slots based upon a barrel count according to an embodiment of the present invention.

Turning now to FIG. 10, a flow chart shows a method of shifting data from upper barrel slots to lower barrel slots based upon a barrel count according to an embodiment of the present invention. In particular, a barrel count is determined in a first clock cycle at a step 1002. Data is output from a plurality of output barrel slots during a second cycle at a step 1004. Data is then shifted into the FIFO during the second clock cycle depending upon the barrel count at a step 1006.

Figure 11:
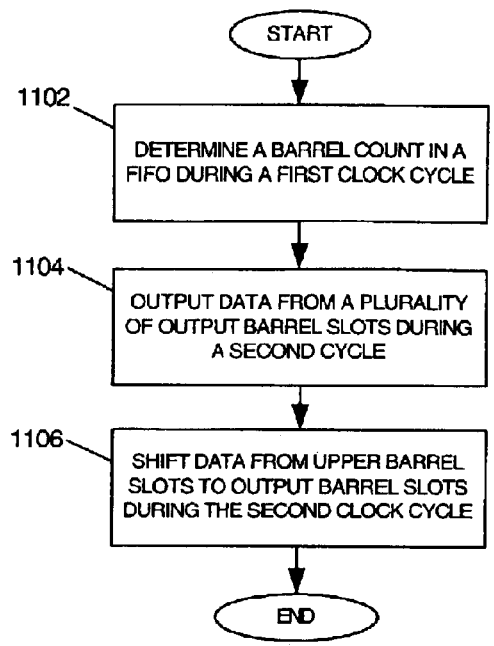
FIG. 11 is a flow chart showing a method of shifting data from upper barrel slots to lower barrel slots based upon a barrel count according to an embodiment of the present invention.

Turning now to FIG. 11, a flow chart shows a method of shifting data from upper barrel slots to lower barrel slots based upon a barrel count according to an embodiment of the present invention. In particular, a barrel count in a FIFO is determined during a first clock cycle a step 1102. Data is output from a plurality of output barrel slots during a second clock cycle at a step 1104. Data is shifted from upper barrel slots to output barrel slots during a second clock cycle at a step 1106.

Figure 12:
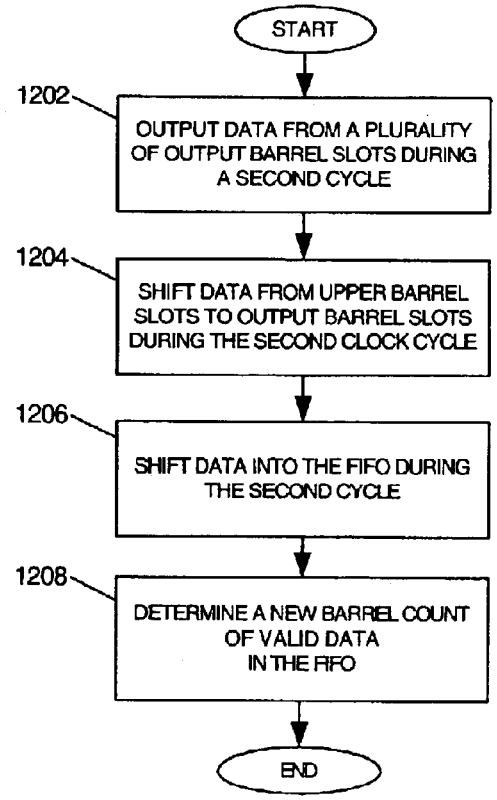
FIG. 12 is a flow chart showing a method of shifting data from upper barrel slots to lower barrel slots and shifting data into a memory based upon a barrel count according to an embodiment of the present invention.

Turning now to FIG. 12, a flow chart shows shifting data from upper barrel slots to lower barrel slots and shifting input data into a barrel slot based upon a barrel count according to an embodiment of the present invention. In particular, data is output from a plurality of output barrel slots during a second cycle at a step 1202. Data is then shifted from upper barrel slots to output barrel slots during the second clock cycle at a step 1204. Data is shifted into a DI-FIFO during the second cycle at a step 1206. Finally, a new barrel count of valid data in the DI-FIFO is determined at a step 1208.

Figure 13:
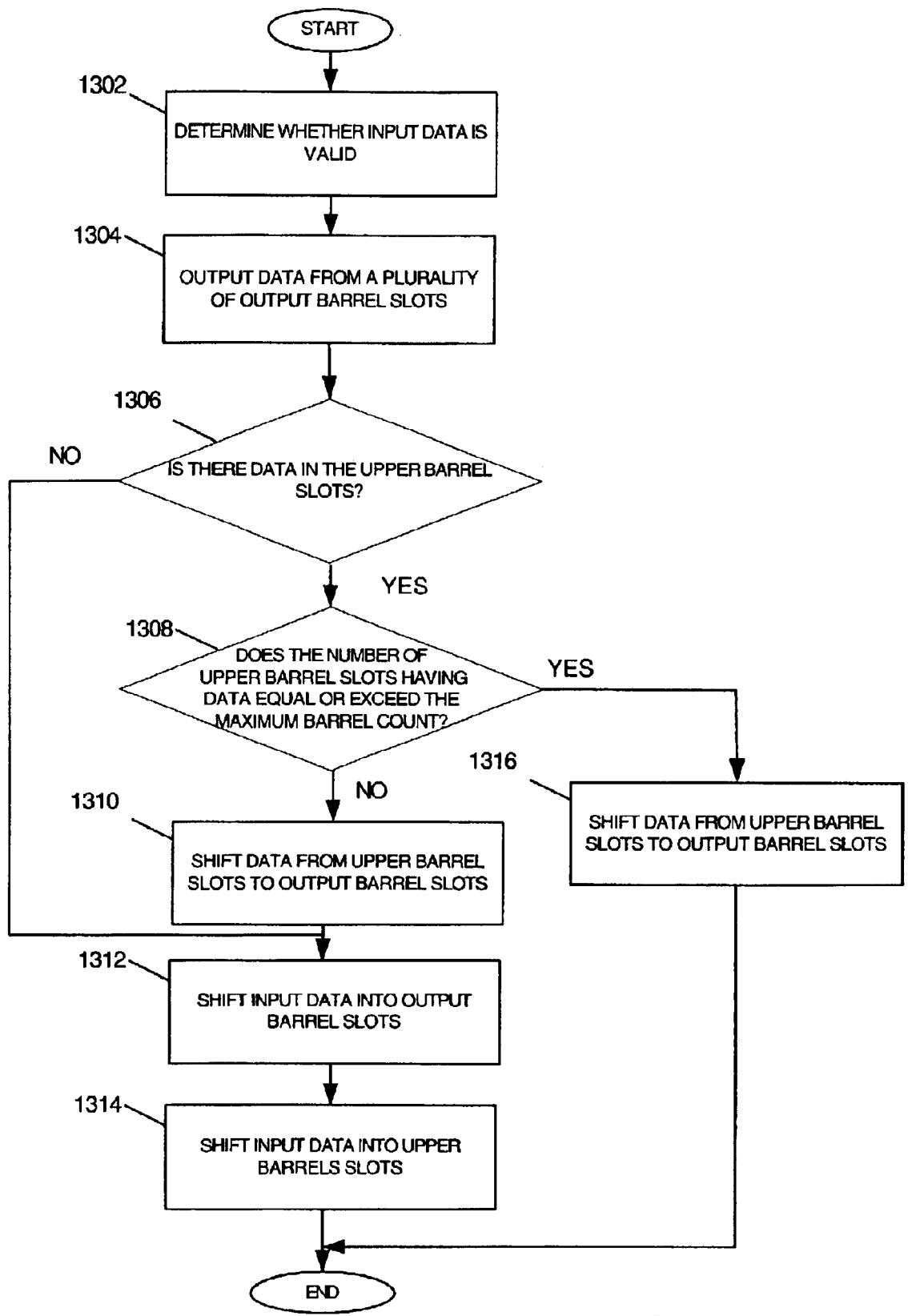
FIG. 13 is a flow chart showing the operation of a FIFO based upon a barrel count according to an embodiment of the present invention.

Turning now to FIG. 13, a flow chart shows the operation of a FIFO based upon a barrel count according to an embodiment of the present invention. In particular, it is determined whether input data is valid at a step 1302. Data is output from a plurality of output barrel slots at step 1304. It is then determined whether there is data in upper barrel slots of a memory at a step 1306. If so, it is determined whether the number of upper barrel slots having data is equal to or exceeds the barrel count at a step 1308. If not, data is shifted from upper barrel slots to output barrel slots at a step 1310. Input data is then shifted into output barrel slots at a step 1312. Input data is also then shifted into upper barrel slots at a step 1314. If there is no data in the upper barrel slots at the step 1306, data as shifted into the output barrel slots and upper barrel slots at steps 1312 and 1314. If the number of upper barrel slots having data is equal to or exceeds the maximum barrel count, data is shifted from the upper barrel slots to output barrel slots a step 1316. That is, no input data is shifted into barrel slots.

It can therefore be appreciated that the new and novel integrated circuit and method of outputting data from a FIFO has been described. It will be appreciated by those skilled in the art that, particular the teaching herein, numerous alternatives and equivalents will be seen to exist which incorporate the disclosed invention. As a result, the invention is not to be limited by the foregoing embodiments, but only by the following claims.

What is claimed is:

1. A method of outputting data from a FIFO incorporated in an integrated circuit, said method comprising:
   determining a barrel count in said FIFO during a first clock cycle;
   outputting data from a plurality of output barrel slots during a second clock cycle; and
   shifting data into said FIFO during said second cycle based upon said barrel count.

2. The method of claim 1 wherein said step of shifting data into said FIFO comprises shifting data into said FIFO unless said FIFO is full.

3. The method of claim 1 wherein said step of shifting data into said FIFO comprises shifting data into output barrel slots.

4. The method of claim 1 wherein said step of shifting data into said FIFO comprises shifting data into upper barrel slots.

5. The method of claim 1 further comprising a step of shifting data from upper barrel slots to said output barrel slots during said second clock cycle.

6. A method of outputting data from a FIFO incorporated in an integrated circuit, said method comprising:
   determining a barrel count in said FIFO during a first clock cycle;
   outputting data from output barrel slots during a second clock cycle; and
   shifting data from said upper barrel slots to said output barrel slots during said second clock cycle based upon said barrel count.

7. The method of claim 6 further comprising a step of shifting data into said FIFO during said second clock cycle unless said FIFO is full.

8. The method of claim 7 wherein said step of shifting data into said FIFO comprises shifting data into said output barrel slots.

9. The method of claim 7 wherein said step of shifting data into said FIFO comprises shifting data into said upper barrel slots.

10. The method of claim 7 wherein said step of shifting data into said FIFO comprises shifting valid data.

11. A method of outputting data from a FIFO incorporated in an integrated circuit, said method comprising:
    outputting data from a plurality of output barrel slots;
    shifting data from at least one upper barrel slot to an output barrel slot;
    shifting data into said FIFO based upon a barrel count; and
    determining a new barrel count of data in said FIFO.

12. The method of claim 11 wherein said step of shifting data from at least one upper layer barrel slot to an output barrel slot comprises shifting data from a predetermined number of upper barrel slots to a corresponding number of output barrel slots.

13. The method of claim 11 wherein said step of shifting data into said FIFO comprises shifting data into said FIFO unless said FIFO is full.

14. The method of claim 11 wherein said step of shifting data into said FIFO comprises shifting data into output barrel slots.

15. The method of claim 11 wherein said step of shifting data into said FIFO comprises shifting data into upper barrel slots.

16. A method of outputting data from a FIFO incorporated in an integrated circuit, said method comprising:
    determining whether input data is valid;
    outputting data from a plurality of output barrel slots;
    shifting data from predetermined upper barrel slots to predetermined output barrel slots;
    shifting valid input data into said FIFO based upon a barrel count; and
    determining a new barrel count in said FIFO.

17. The method of claim 16 wherein said step of shifting data from predetermined upper barrel slots to predetermined output barrel slots comprises shifting data based upon said barrel count.

18. The method of claim 17 wherein said step of determining a new barrel count of valid data in said FIFO comprises determining a new barrel count during a second clock cycle based upon valid data.

19. The method of claim 17 further comprising a step of shifting data into said FIFO unless said FIFO is full.

20. A method of outputting data from a FIFO incorporated in an integrated circuit, said method comprising:
    determining whether input data is valid during a first clock cycle;
    outputting data from a plurality of output barrel slots during a second clock cycle;
    shifting data from predetermined upper barrel slots to predetermined output barrel slots during said second cycle based upon a barrel count;
    shifting valid data into said FIFO during said second cycle based upon said barrel count; and
    determining a new barrel count of valid data in said FIFO.

21. An integrated circuit incorporating a FIFO, said integrated circuit comprising:
    a multiplexer coupled to receive data from a plurality of inputs;
    a barrel count signal coupled to said multiplexer; and
    a memory coupled to an output of said multiplexer, said memory having a plurality of barrel slots receiving predetermined data depending upon said barrel count signal.

22. The integrated circuit incorporating a FIFO of claim 21 further comprising a second multiplexer coupled to receive a barrel valid signal.

23. The integrated circuit incorporating a FIFO of claim 21 further comprising a validation circuit for determining whether data to be loaded in a barrel slot said memory in a second cycle is valid.

24. The integrated circuit incorporating a FIFO of claim 23 further comprising a barrel valid signal generated by said validation circuit.

25. The integrated circuit incorporating a FIFO of claim 24 further comprising a plurality of barrel valid signals.

26. The integrated circuit incorporating a FIFO of claim 21 wherein said plurality of inputs comprise predetermined inputs based upon said barrel count signal.

27. The integrated circuit incorporating a FIFO of claim 21 further comprising a circuit for generating said barrel count signal.

28. The integrated circuit incorporating a FIFO of claim 26 wherein said circuit for generating said barrel count signal determines whether data is present in said upper barrel slots.

29. An integrated circuit incorporating a FIFO, said integrated circuit comprising:
    a first multiplexer coupled to receive data from a plurality of inputs;
    a barrel count signal coupled to said first multiplexer;
    a second multiplexer coupled to receive a barrel valid signal; and
    a memory coupled to an output of said second multiplexer, said memory having a plurality of barrel slots receiving predetermined data depending upon said barrel count signal.

30. The integrated circuit incorporating a FIFO of claim 29 further comprising a validation circuit for determining whether data to be loaded in a barrel slot in said memory in a second cycle is valid.

31. The integrated circuit incorporating a FIFO of claim 30 further comprising a barrel valid signal generated by said validation circuit.

32. The integrated circuit incorporating a FIFO of claim 31 further comprising a plurality of barrel valid signals.

33. The integrated circuit incorporating a FIFO of claim 29 wherein said plurality of barrel slots comprise output barrel slots providing a constant output barrel count.

34. The integrated circuit incorporating a FIFO of claim 29 further comprising a circuit for generating said barrel count signal.

35. An integrated circuit incorporating a FIFO, said integrated circuit comprising:

a first multiplexer coupled to receive data from a plurality of inputs;

a count circuit coupled to said first multiplexer and generating a barrel count signal;

a second multiplexer coupled to receive a barrel valid signal;

a validation circuit coupled to said second multiplexer, said validation circuit providing said barrel valid signal to said second multiplexer; and a memory coupled to an output of said second multiplexer, said memory having a plurality of barrel slots receiving predetermined data depending upon said barrel count signal.

* * * * *